G. & M. MACBETH.
CASH REGISTER.
APPLICATION FILED JAN. 8, 1915.

1,269,473.

Patented June 11, 1918.
8 SHEETS—SHEET 1.

G. & M. MACBETH.
CASH REGISTER.
APPLICATION FILED JAN. 8, 1915.

1,269,473.

Patented June 11, 1918.
8 SHEETS—SHEET 4.

Witnesses

Inventors
G. Macbeth &
M. Macbeth
By _____ Atty.

G. & M. MACBETH.
CASH REGISTER.
APPLICATION FILED JAN. 8, 1915.

1,269,473.

Patented June 11, 1918.
8 SHEETS—SHEET 7.

Witnesses
Floyd R Conwall
Miriam Stern

Inventors
G. Macbeth &
M. Macbeth
By ......... Atty.

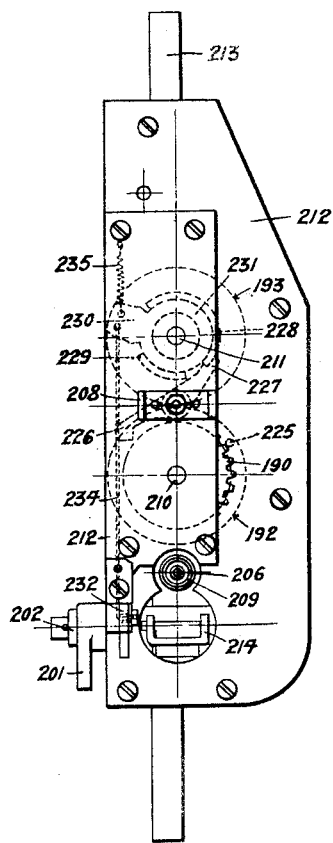

UNITED STATES PATENT OFFICE.

GEORGE MACBETH AND MALCOLM MACBETH, OF SEFTON PARK, LIVERPOOL, ENGLAND.

CASH-REGISTER.

1,269,473.   Specification of Letters Patent.   Patented June 11, 1918.

Application filed January 8, 1915. Serial No. 1,263.

*To all whom it may concern:*

Be it known that we, GEORGE MACBETH and MALCOLM MACBETH, subjects of the King of England, residing at 4 Streatham avenue, Sefton Park, Liverpool, in the county of Lancaster, England, have invented new and useful Improvements in or Connected with Cash-Registers, of which the following is a specification.

This invention has reference to apparatus used in connection with the selling of goods and the indicating and recording of cash received for same, including the indicating to the purchaser the sum paid to, and received by the seller. Such apparatus are generally called "cash registers"; and the type of such apparatus more particularly concerned is that wherein the amount of cash received or recorded, is added up by a suitable totalizing mechanism, and the amounts of transactions are recorded on a recording ribbon or strip, in connection with time and date records; and a ticket is printed and delivered to the purchaser. Furthermore the type to which the apparatus and invention specially relates is that wherein keys or parts are moved by hand and through a rack or the like, having rectilinear movement, set in action thereby, the money adding mechanism is operated, and according to the degree of movement produced by the longitudinal movement governed by the hand actuated key or part, so will be the amount added.

The chief object of the present invention is to provide a machine of this kind or character which is reliable and at the same time convenient, and provides an advantageous compact and inexpensive form of machine, capable of accomplishing all the effects herein referred to.

The invention is illustrated in the annexed drawings, in connection with which it will be described; while the features which are claimed as novel, are those set out in the claiming clauses concluding the specification, the invention covered under the respective, clauses being the several features or parts included in them, in combination, and not individually or separately.

Figure 1:
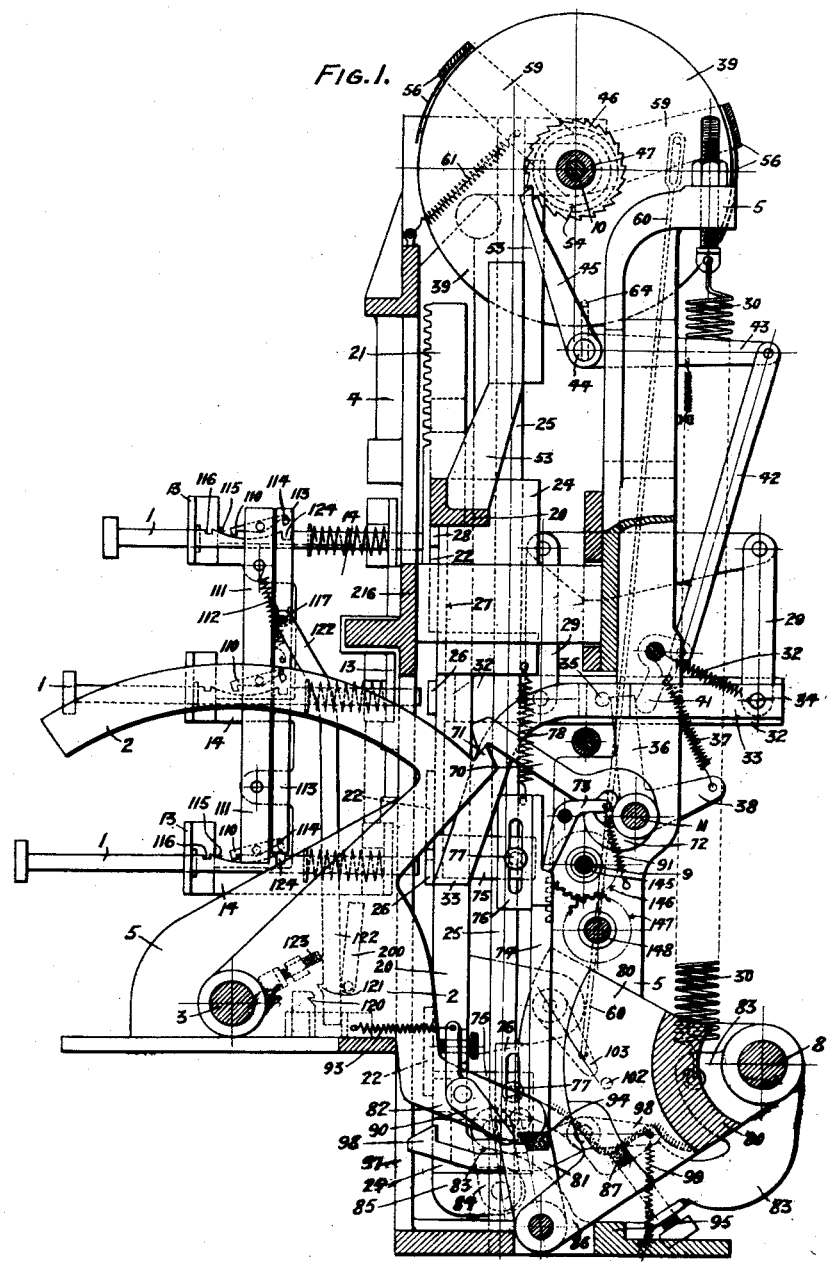
Figure 2:
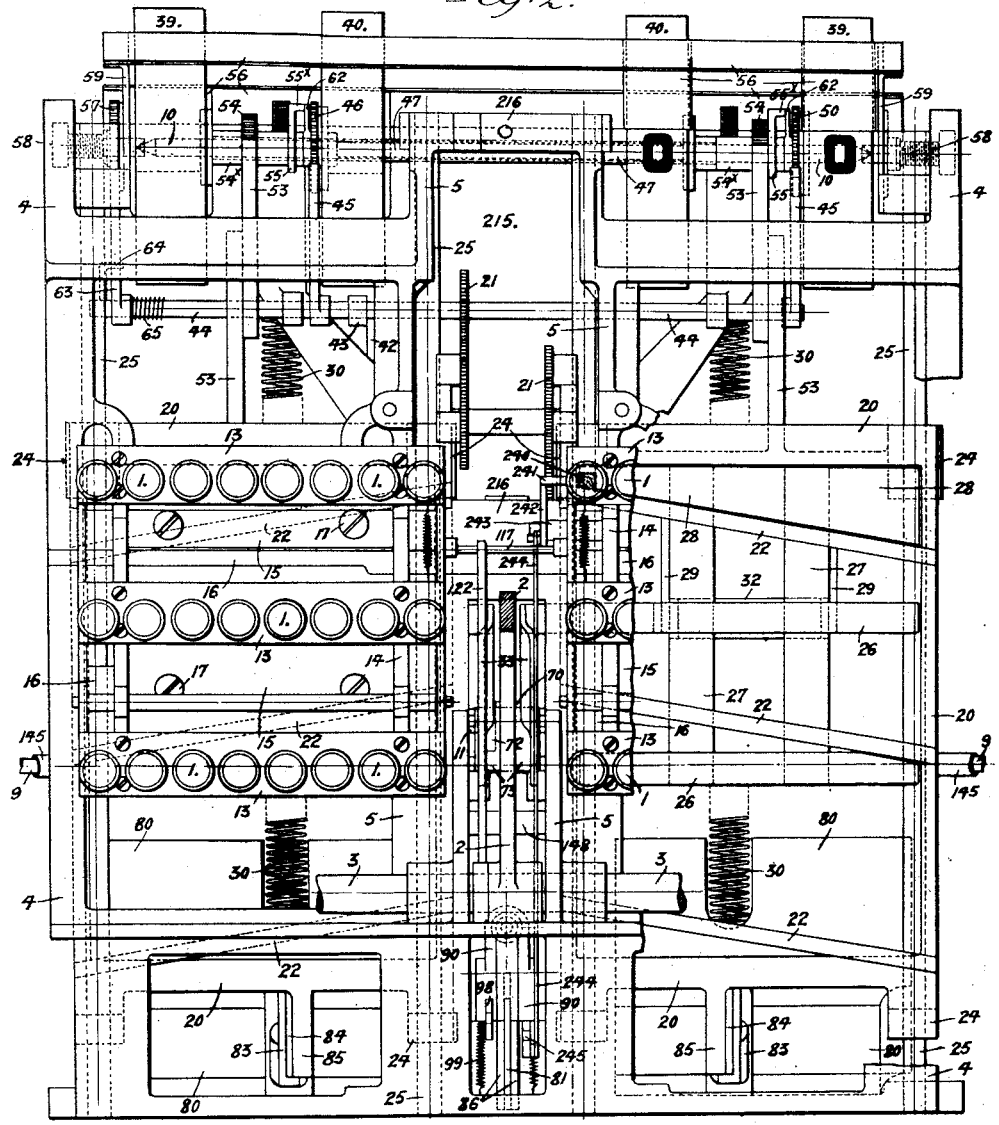
Figure 3:
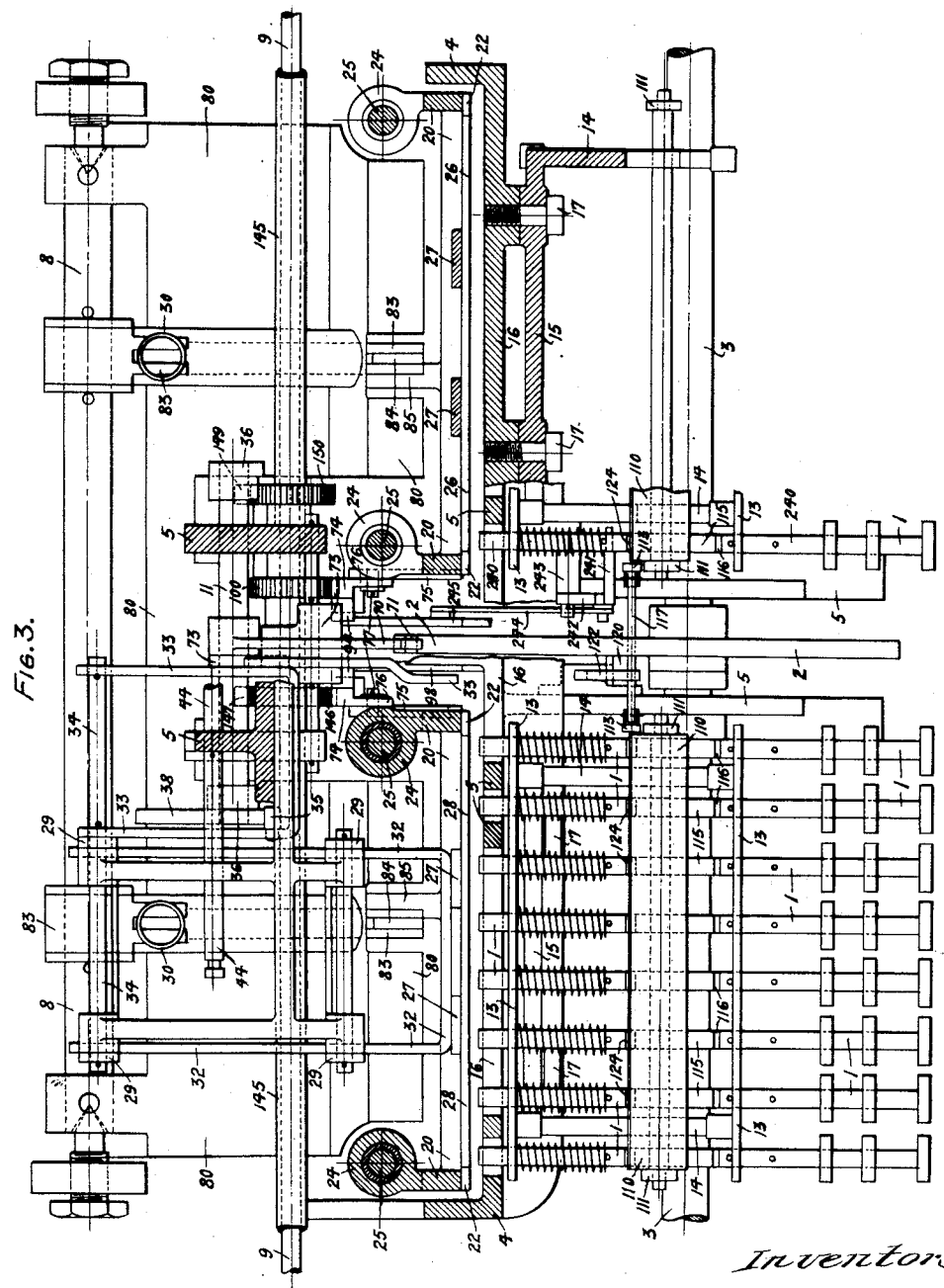

In the drawing, Figure 1 is a cross section showing the machine; Fig. 2 is a front view, and Fig. 3 is a plan in section.

Figure 4:
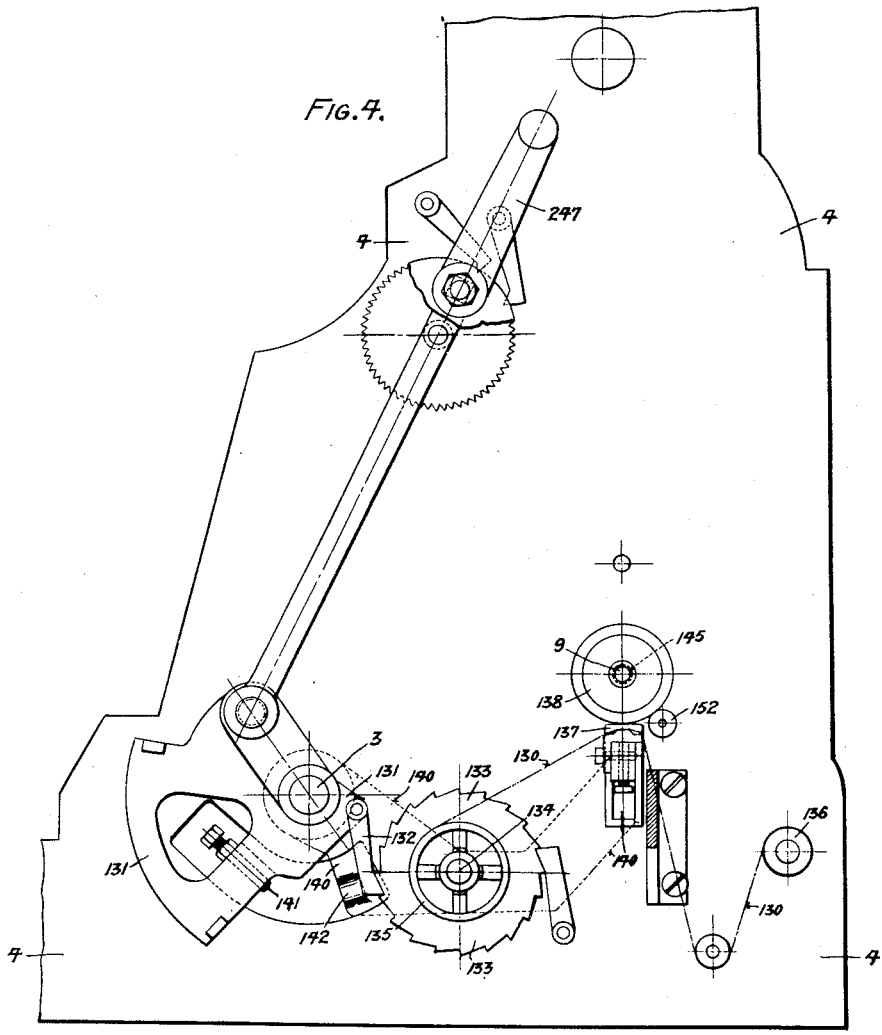
Figure 5:
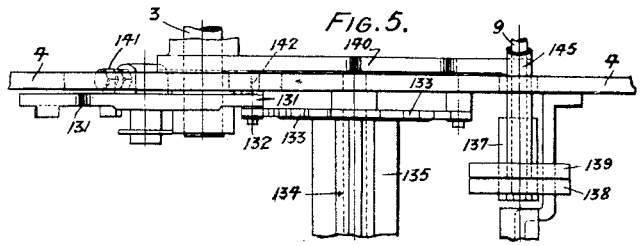
Figure 6:
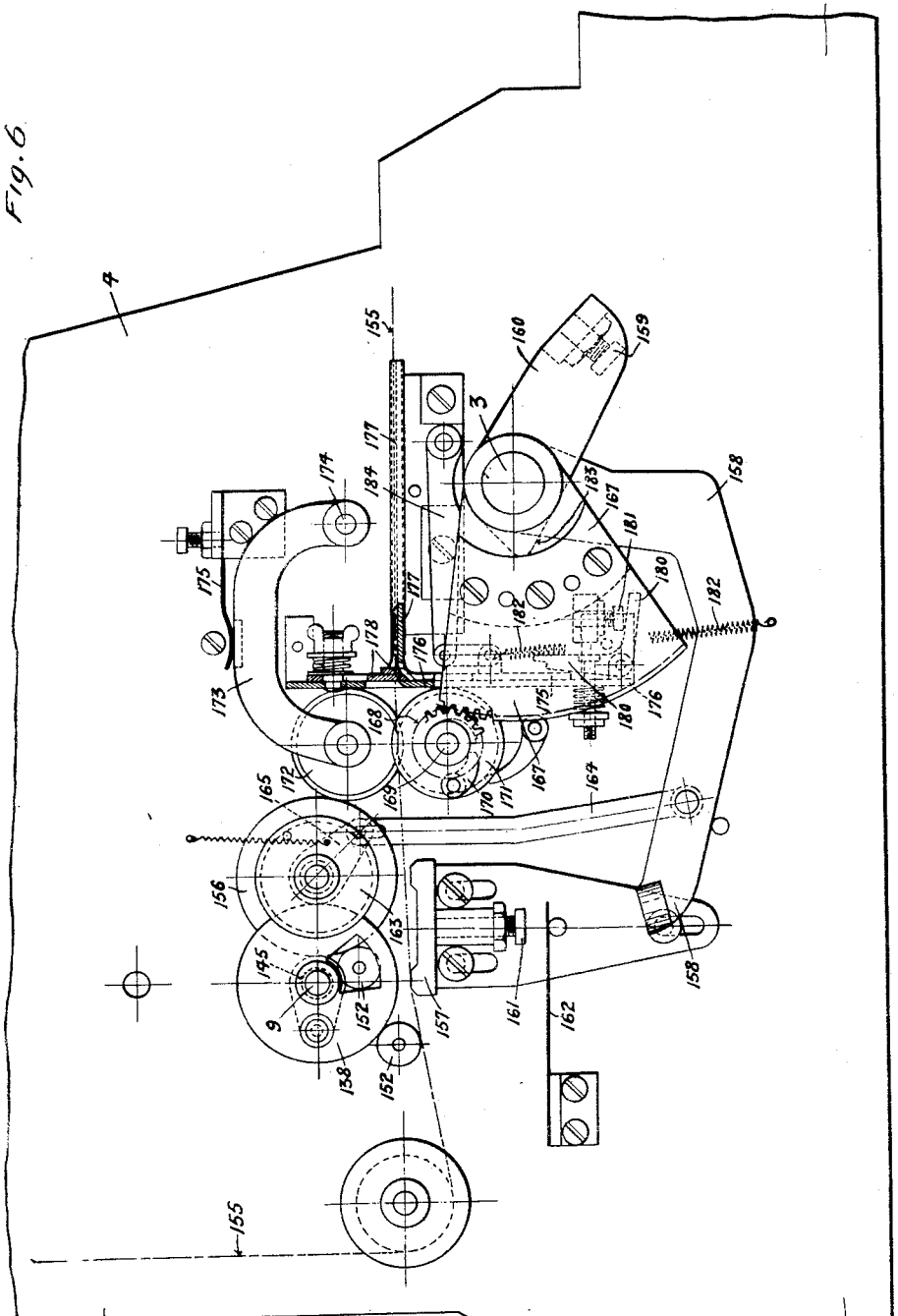
Figure 7:
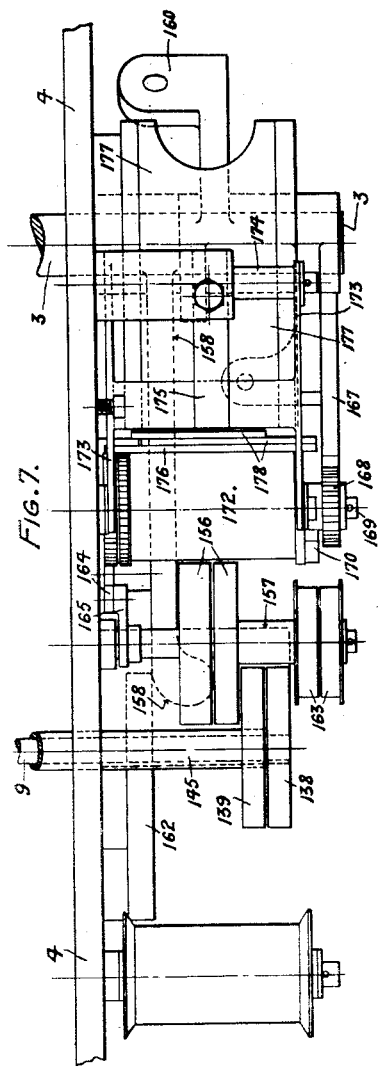
Figure 8:
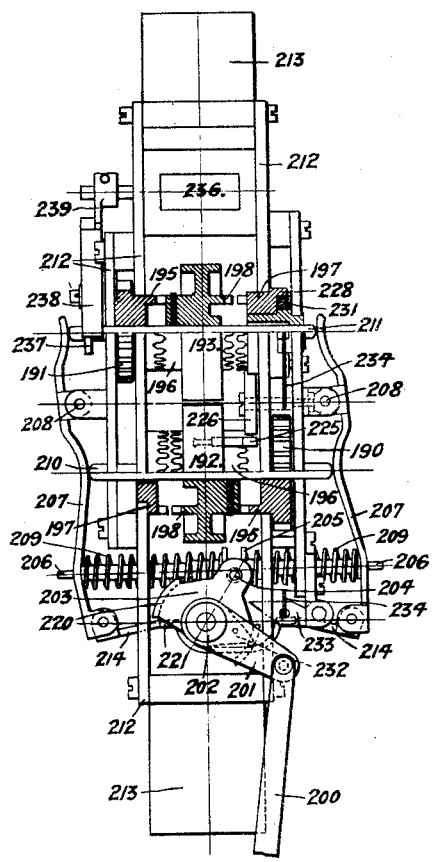
Figure 10:
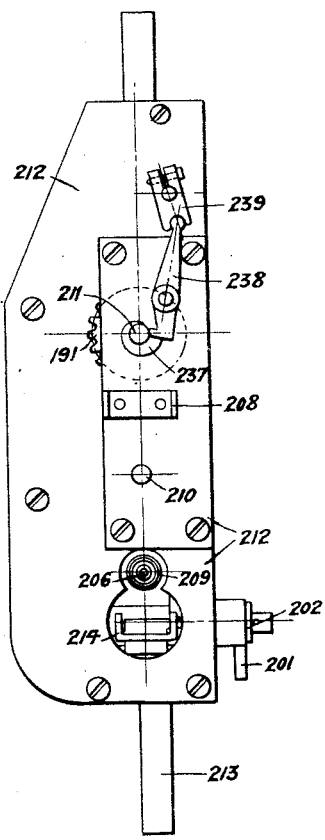
Figure 11:
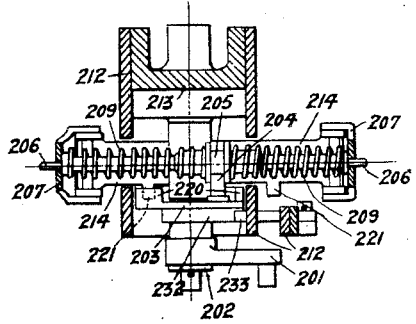

Figs 4 and 5 are elevation and plan showing details, and Figs. 6 and 7 are elevation and plan of further details; while Figs. 8, 9, 10 and 11, are views illustrating parts of the apparatus separately.

Referring to the drawings, 1 are the keys, constituting the primary hand operated parts of the machine; and in the case shown, the keys have a movement in the horizontal plane, and are arranged in two sets, one on each side of the center in a plurality of rows, 2 is a hand operated handle or lever which co-acts with the keys 1 in using the machine, and which performs the various functions hereinafter described.

The handle or lever 2 is disposed in the center of the machine, and is fixed on a transverse spindle 3 supported at its ends by outside members 4 of the main frame, and near the lever by the inner members 5 of the frame, between which it works.

Other transverse shafts extended across the machine between the outside frames 4 for working various parts. Namely, there is below a shaft 8 carrying certain controlling gear; a shaft 9 above this which carries parts for operating the printing mechanism; and a shaft 10 at the upper part supported in the frame 4 which carries the cash indicating parts.

Besides these shafts there is a short shaft 11 above and near the shaft 9, supported in the inner frame parts 5, and carrying the mechanisms connected with the locking and releasing of various parts.

The keys 1, that is the spindle parts of them are supported by plates 13 fastened on outwardly projecting parts 14 on the bracket 15, which are fixed by studs 17 on to transverse horizontal members 16, connecting the frames 4 and 5 together, and preferably cast with studs.

The keys 1 operate in connection with a gate device 20, which has vertical bodily rectilinear movement, and has connected with it, at its upper part, the racks 21, by which the total adder above referred to, is actuated, and where the term "gate" is used herein, it is intended to define the device as one having a gate like frame with bodily rectilinear movement.

The gate device 20 has diagonal bars 22 extending across it, which are carried at their ends by the side frame members of the gate; and these have bosses 24 on them, which slide up and down, and are supported and guided by vertical guide rods 25.

Any of the keys 1, when moved in by hand, act upon a swinging locking and releasing means, consisting of horizontal plates 26 fixed on vertical plates 27, which carry at their upper ends, a plate 28, which operates in connection with the gate so far as vertical movement of it is concerned, and constitutes the vertical locking means. Namely, when a key is operated, it acts upon one of the bars 26 or 28, as the case may be, and presses this locking device or means back, and so moves the upper plate 28 back and out of the way; that is, out of the plane of the upper bar 22 of the gate, which it normally stands above.

The plates 26, 28, and the bars 27, constitute a species of swinging frame, which is supported from a fixed part of the machine by suspension links 29, so that it is capable of being moved horizontally; and when it is so moved by a key, so that the bar 28 is moved away back out of the plane of a gate bar 22, it allows it to move up, which is effected by a spring 30; as hereinafter described, and according to which key is moved in, so will be the degree of movement vertically of the gate permitted, and this is governed by the diagonal inclined bars 22 of the gate.

Thus according to which key is moved into the path of the diagonal gate bars 22, so will be the upward amount of movement of the gate; the distance from the axes of the keys of the different rows, and the active edges of the different diagonal bars 22 vertically, being different in the rows of keys, starting at the smallest at one end of the top row, and finishing with the largest at the opposite end of the lowermost row.

The machine shown is adapted for registering both pence and shillings; and has a fac-simile arrangement, and duplication of key parts, and gate device on each side of the machine; the two racks 21 connected with the gate 20 being on opposite sides of the center of the machine, as shown in Fig. 2, and working in connection with the pence and shillings toothed wheels, and portion of the adding mechanism, respectively.

One, say the right hand set of keys, and gate device, may be used for operating the pence registering mechanism; and the other set for operating in connection with the shillings registering mechanism.

The gate, when operated, and after each actuation, is moved down to its normal or zero position (shown in the drawings) by a handle lever 2, and is held there by the plate 28 of the swinging frame 26, 27, by its lower edge standing above the upper edge of the upper diagonal gate bar 22.

By this form and arrangement of gate device, no matter what key 1 is actuated, it acts upon a part of the swinging frame (26, 27, 28,) and frees the gate, so that it can rise vertically; the swinging frame therefore constituting a common locking and releasing device of the gate.

The swinging frame 26, 27, 28, is supported by the links 29, through horizontal backwardly projecting bars 32 fixed to the back of the frame, which their lower ends are hinged to.

Connected with the locking and releasing frame device 26, 27, 28, there is an arm or bar 33, the inner end of which is bifurcated or in the form of a fork, which is supported by the hinge rod 34 connecting the links 29 and the bars 32.

This bar 33, on its forked end, has a projection 35 adapted to act on a lever or arm 36 fixed on the transverse shaft 11, and normally pressed against it by a spring 37, which pulls on a projecting arm or lever 38 connected with one of the arms 36. These arms 36 are for the purpose of operating the money indicating pence and shillings drums 39 and 40; namely, one of the arms 36, the left hand one, acts upon a small bell crank lever 41, which through a link 42 acts on an arm 43, fixed on a transverse shaft 44, on which are fixed two holding and releasing pawls 45, one of which acts on a ratchet wheel 46, fixed on a sleeve 47, loosely mounted on the shaft 10, to which the two inside shilling drums 40 are fixed.

The other, namely, the right hand holding and releasing pawl 45, works in connection with a ratchet wheel 50, fixed on the spindle 10, to which the two outer pence drums 39 are fixed; so that these holding and releasing pawls 45, being both fixed on and moving with the shaft 44, move into and out of engagement with the two ratchet wheels 46 and 50 together.

When therefore, the bell crank lever 41 is moved (which takes place whenever a key is pressed in) the pawls 45 will be removed from the ratchet wheels 46 and 50, and free all the money drums, two of which will indicate the date on them from the front; while the other two will indicate from the back.

The pence and shillings drums 39, 40, are themselves rotated when the machine is used, by upwardly projecting parts 53 on the gates 20, having on the upper end of each a toothed rack, which engages with a toothed pinion 54, formed on a sleeve 54$^x$. One of these pinions 54, and its sleeve 54$^x$, namely that on the left hand side, is loosely mounted on the sleeve 47 surrounding the spindle 10; and to the sleeve 47 the drums 40 (to which the ratchet wheel 46, is fixed) are fixed. On the sleeve 54$^x$ is an arm 55, having a bent over end 55$^x$, which operates on an arm 62, loosely mounted on the sleeve 47, and working between two projections on the face of the wheel 46, against which it lies.

A coil spring (not shown in the drawings) is connected at one end with the sleeve 54ˣ, around which it is wound, and at the other end to a part of the loose arm 62. The arm 62 has a certain amount of free movement between the stops, which is necessary for the actuating of the mechanism. In action when the wheel 54 is turned by the rack 53, the ratchet wheel 46 of the two drums 40 will be revolved. The parts are so arranged, that when after the drums 40 have been moved by the rack 53 to a given position, they will be returned through the strain in the springs, when the holding pawl 45 is removed from the ratchet wheel 46.

The other pinion 54 is also fixed on a sleeve 54ˣ as the former, and has an arm 55 which operates the loose arm 62, working in connection with the ratchet wheel 50, and a spring, similarly as in the left hand drum mechanism.

The right hand drum 39 is fixed to the ratchet wheel 50, and to the spindle 10; and the left hand drum 39 is also fixed to the spindle, so that when this right hand mechanism is operated, the left hand drum 39 moves too.

The whole of the parts of the machine are inclosed in a casing (not shown) and such casing has windows in it at the front and back say in the same horizontal plane as the spindle 10, through which the data on the drums 39, 40, will show.

It is to be noted that while the above described gate 20 has been specified as being released, and moved upward by a spring 30, it does not do so at the mere releasing of the gate by the swinging frame (26, 27, 28) but is moved only by the spring when the controlling mechanism actuated by the handle 2, is operated. It is also to be noted that while in the case shown and described, the gate is moved upward by means of a weight, as a modification, it may be arranged to move downward by its own weight.

It is only after the drums have been moved in using the machine, and effecting a registering and indicating action, that the drums 39, 40, and the data on them are seen through the windows of the case. Namely, when the machine is at rest, the numerals representing the last sum taken and indicated, will be seen at the windows; but before the drums are brought to zero, which takes place at the commencement of use of the machine, on pressing in a key 1, the numerals of the drums will be hidden by shutters 56, which work over the drum faces; they being fixed to and controlled by a sprocket wheel 57 mounted on one of the two stump spindles 58, fixed in the frames 4; (the spindles 58 supporting the ends of the spindle 10 at their ends) and connected with the shutter by an arm 59, of which there is one at each end which carry the shutters. The shutters are positively moved in one direction by a rod 60 connected with one of the arms 59 as hereinafter described and in the other by a spring 61. When however, the movement of the drums 39, 40, is completed in the actuation of the machine, first to zero, and then to the position for indicating the cash received, the shutters 56 are released and removed from in front of the windows.

The shutters are operated by the spring 61, which pulls them over the parts of the drums opposite the windows when the pawls 63, which hold and release the sprocket wheel 57, are removed from same, which action is arranged to take place momentarily in advance of the removal of the pawls 45, from the ratchet wheels 46 and 50; and this backward movement of the pawl 63 is effected by a pin 64, fixed in the shaft 44; while its inward movement is effected by a coiled spring 65, connecting it with the shaft 44. By means of this arrangement the pawls 45, and the pawl 63, are capable in one direction, of independent movement, more or less.

With regard to the handle 2, this is only moved after the keys 1 have been actuated, and it performs various functions hereinafter described; and when the machine is in the normal condition, the handle is engaged and held by a catch or detent 70, loosely mounted on the shaft 11; its end engaging with the catch 71 on the handle. But when a key is pressed in, and the releasing and locking frame 26, 27, 28 and parts above described, are actuated, the catch 70 is actuated, and frees the hand operated lever 2.

In the construction shown, this freeing action is effected by an arm 72 fixed on the shaft 11, which acts on the arm of the catch 70 (through a bell crank trigger 73 hereinafter described) and operates it; the shaft 11 being, as stated, actuated, that is, partially rotated, when the key is moved in.

The hand lever 2 is now free to be moved.

Simultaneously, with the movement of the catch 70, by the arm 72 the triggers 73 will be moved. These triggers act as detents to and work in connection with two rack bars 74, one on each side of the machine, which operate in connection with the gate 20, so that when the triggers 73 are actuated as just described, they move out of the path of and free the rack, and so the gate 20—which is connected with the rack 74 by bars 75, and slotted ends 76 on them through which pin 77 passing through the slots—is freed, and can then be moved up by the spring 30 when the handle 2 in actuated, but not before.

The rack bars 74 which operate in connection with and are controlled by the trigger pawls 73, and with the gates, are capable of relatively vertical movement to a certain extent, with the gate, this being provided by the slots 75 and pins 77 above described. That is, the bars are free to slide more or less vertically in relation to the gate; this independent or free motion being provided for purposes hereinafter described.

The racks 74 are normally pulled upward by springs 78.

These racks 74 are moved by the gate 20, and operate pinions 100 and 146 on the spindle 9, which operate the paper tape and ticket printing or marking means, consisting of type wheels, containing types representing money.

The limited movement of the rack parts 74 is primarily intended to cause a preliminary inking of the type wheels, prior to such type being impressed upon the recording tape and ticket; namely, when these rack bars are released by the triggers 73, the slots in the parts 76 allow of them being moved up over the pins 77 by the springs 78 to the end of the slots, and so they actuate the toothed wheels 100 and 146 and shaft 9, and sleeve 145, on which the type wheels are fixed.

With reference to the means of actuating the gate as above described, this is effected through the spring 30, but this spring can only act on the gate when it is freed, it being normally unable to act by parts, hereinafter described, between it and the gate, which hold it down in its lowermost position.

This holding means consists of a weight 80 fixed on to the transverse shaft 8, on the back of the machine, and having a forwardly projecting part 86, connected by the link 81 at its front end, with the projection part 82 of or connected with the hand lever 2. The weight 80, of course will exert greater force than the spring 30; instead of a weight, however being used, a spring stronger than the spring 30 could be used.

The spring 30 is connected to a lever 83 loosely mounted on the shaft 8, and extending toward the front of the machine, where it is connected by a link 84 with the bottom part 85 of the gate 20; and the weight 80 rests and acts on the lever 83 through an adjustable pin 87, on the end of which the dotted shaded part (see Fig. 1) of the weight 80 rests. Thus when the weight 80 is resting on this pin 87, it keeps the lever 83 down, and the spring 30 in tension, and also holds the gate 20 down; but when the lever 2 is pulled forward, the weight 80 will be lifted off the pin 87, and so the lever 83 and gate 20 will be freed, and the spring 30 can lift them up; and this will take place when one of the keys 1, is pressed in, and the gate freed by the swinging frame 26, 27, 28.

The movement of the weight 80 by the hand lever 2 will be much greater than the upward movement of the gate 20 and lever 83; but this extra movement does not affect the gate's action.

Instead of the lever 83 being lifted by a spring it might be worked by a weight.

The function and effect of the weight 80 is to govern or regulate the upward movement of the gate 20.

With regard to the mode of operating the hand lever 2, it is the duty of the user to move it to its full stroke or extent. Thus in all cases, when the gate reaches the end of its up-stroke, whether a portion of the total proper stroke or the whole of it, the weight 80 moves away from the spring pressed arm 83, whose motion upward is limited, through the limited movement of the gate.

In the latter portion of the outward stroke of the hand lever 2, a part on it, namely the boss of the double bell crank levers 90 arranged on each side of and pivoted on the part 82, strikes the lower end of the projecting bar 33 of the swing frame 26, 27, 28. and lifts it, and so lifts the projection 35 above the end of the arm 36, so that the spring 37 acting on the arm 38, can turn the shaft 11, and so cause the arm 72 to move down; the catch 70 thereby being free to move down also into the engaging position.

In this movement of the arm 72, it moves away from the trigger or detent 73, the lower end of which will be pressed against the face of the rack bar 74, so that when this rack moves down till the upper end of the rack proper is below the level of the lower end of the trigger 73, it—the trigger—can be moved by a spring 91 over to the locking or holding position as seen in Fig. 1; whereupon the upper arm of the detent 73 will come on to the nose of the lever 72, when the catch 70 can drop down into the engaging position.

By this outward movement of the hand lever 2 as stated, the gate 20 will have been freed so as to be able to rise; and when this latter action takes place, the racks 21 are moved, and the adding mechanism for the totalizing of pounds, shillings, and pence will be effected; also the shillings and pence drums 40 and 39, will be actuated by the racks 53; the type rollers for printing the paper ribbon and ticket, through the racks 74, will be actuated and set to the position corresponding with the sum of money taken and registered; and the money drum pawls 45 are moved to engage the ratchet wheels 40 and 50.

The next operation is the return action of the hand lever 2. In the first position of this return stroke, the lower outer end of the double hinged trigger 90 (which is normally pulled up by a spring 93) acts upon the type wheel actuating rack parts 74; namely this trigger acts on a block 94 on each of the bottoms of the rack bars 74, and moves these rack bars down; and in this operation the weight 80 will also have been lowered by the lever 2, and will have come in contact with the pin 87 on the arm 83, and so moved it down; and as this arm or lever 83 moves down, the gate 20 is pulled down by it. So the rack bars, and the gate, move down together, but their movement is effected by independent means.

The lowermost position of the lever 83 is governed by a stop 95 on the bottom of the machine with which it comes in contact.

Near the end of the stroke of the lever 2, the trigger 90 will move off the blocks 94, and out of their paths, whereupon the rack bars 74 can be moved by the springs 78, so that the top of the racks will come on to the end of the trigger 73.

The inner end of the cash drawer of the register (not shown) will lie in the base of the frame of the machine, immediately under the shaft 3, and will come up to the vertical part 97 of the frame, having on its end an eye or engaging part in the well known way, which is adapted to engage with the end of the hook lever 98 hinged to the frame, and normally pulled by a spring 99.

In and by the latter portion of the stroke of the hand lever 2 this catch 98 is depressed, and frees a drawer, this being effected by a projection (not shown in the drawings) on the lever 98 with which one of the tappets 90 comes in contact; and it slips off the same similarly as the tappet lever 90 slips off the blocks 94 of the rack bars 74.

Also toward the latter portion of the stroke of the lever 2, a pin 102 on the weight 80 comes in contact with an arm 103 pivoted on the frame of the machine, and connected by a rod 60 with one of the arms 59 of the shutters 56, and pulls one down, and so the other up, to the position shown in Fig. 1, so as to expose the back and front numerals of the numeral drums 39, 40. During this action the ratchet wheel 57 will click over the teeth of the holding pawl 63, which it can do through the "give" of the spring 65.

Thus when this action last described takes place, and when the return movement and operation of the hand lever is nearly completed, the amount of the transaction will be indicated by the cash drums, both at the front and the back of the machine.

Regarding the actuating keys, they have locking and interlocking arrangements, by which those actuated will have been held in position to which they were moved, up to this point of the cycle of operations of the machine and they are subsequently to this time, adapted to be released.

The other keys will also be locked by the interlocking mechanism in their outer and stationary positions, and must therefore now be freed.

This freeing action is also adapted to be effected during the last portion of the stroke of the hand lever 2, but it must be after the gate is fully drawn down, and held by the weight 80.

The interlocking arrangement shown in the drawings, comprises continuous hinged double pawls 110, hinged at their ends to stationary bars 111, fixed on the frame parts 14; and they are normally pulled to the position shown in Fig. 1, by a spring 112, fixed at one end to a bar 111, and at the other end to vertical movable bars 113, which are connected to the pawls at 114 by pins on the adjacent ends of each of the several continuous pawls, which pass through the bars. Thus by the spring 112, all the pawls normally will be held in the position shown in Fig. 1.

The bars 113 of the set of keys, on each side of the machine, are connected together by a pin 117.

The pawls are of a continuous plate form, with a continuous catch or hook on each end, of the shape seen in Fig. 1. When a key 1 is pushed in, a curved cam shaped part 115, comes in contact with the pawl catch 110, and moves it up about its hinge; and when the key has been pressed in a certain amount, the front catch of the pawl 110 passes the end of this cam surface, and the catch is pulled up or tilted by the spring 112, and the pawl catch, 110, falls into the notch 116, and so locks the key. The key so actuated remains in this locked position until practically the end of the inward or return stroke of the hand lever 2. Also by the pressing in of a key 1, the back catches of the pawls 110 will move into the gaps 124 of the spindles of the keys, which have not been actuated, and lock them.

In this action a hook 120 on the side of the lever 2, comes in contact with the catch 121 on a bar 122, connected at its upper end to the pin 117; and this catch 120 at the end of the stroke of the lever, engages the hook 121 momentarily, and pulls the rods 113 down, and so trip the front catches of the pawls 110 up, so as to be clear of the notches 116.

At this stage the bar 122 is knocked out of engagement with the catch 120 by the adjustable tappet device 123 on the handle 2; and then the bars 113 are free to be moved up by the spring 112, and this takes place; and so the tumbler pawls 110 are reversed, and the key which was pressed in can move out, all those keys which have not been used, and have been held and locked by the back catch ends of the tumbler pawls 110 engaging with the back gaps 124 of the keys are freed.

When the key that was pressed in presses by the cam surface 115, the front end of its pawl 110, this act, through the construction and arrangement described, causes all the back catches of the pawls to fall into gaps 124 in all the other key spindles.

When this takes place, by the keys being now moved to their outer positions, the locking and releasing swinging frame 26, 27, 28, is enabled to swing in, and move forward over the uppermost bar 22 of the gate 20 and so lock the gate in its normal position vertically; while before this it was held back, and in the position in which the gate is unlocked.

The record tape printing mechanism is fixed to the outside of one of the frames 4 of the machine. This tape is designated 130, and is operated from the shaft. On this shaft is fixed a plate lever device 131, having a pawl 132 on it, which engages and operates the ratchet wheel 133, revolving on a shaft 134, having fixed upon it a drum 135, on which the record strip 130 is wound; so that as the shaft 3 is moved to and fro, the paper 130 is wound on the drum 135, and off the store drum 136, passing on its way over the vertically movable presser block 137, which presses it against the pence and shilling wheels 138 and 139.

The presser bar 137 is operated by a lever 140 on the inside of the frame 4, and is mounted loosely on the shaft 3; and it is adapted to be raised at the end of the outward pull of the lever 2 by a tappet 141 on the plate lever 131 coming in contact with the part 142 on the lever 140, which presses it up, and so elevates the block 137, and presses the tape 130 on to the type wheels.

The pence and shillings type wheels 138 and 139 are provided on both sides of the machine; and as seen in Figs. 4 to 7, are mounted respectively on the spindles 9 and sleeves 145.

The pence rack 74 will engage with the wheel 100 on the spindle 9, and so revolve the shaft 9; while the sleeve shafts 145 are revolved from a wheel 146 fixed on it (see Fig. 3) engaging with the shilling rack; and this wheel 146 meshes with and drives another wheel 147 fixed on a short lay shaft 148, having on its opposite end another toothed wheel 149, which meshes with a wheel 150 on the other sleeve 145, so that these sleeves 145 are continued both to the paper strip recording mechanism; and also the ticket printing delivering mechanism at the other side of the machine, and are both operated.

The zero position of the type wheels 138 and 139 is always at a position which will be acted upon by the inking rollers 152, so that in each action, when the type rollers are revolved, they will always be freshly inked in moving over the block 137; and this preliminary movement was effected by the spring 78, which pulls up the rack 74 when the trigger 73 is removed from it; this movement being allowed by the slotted parts 76 of the racks.

With regard to the ticket printing and delivering mechanism, (seen in Figs. 6 and 7), and the tickets to be delivered to customers, this mechanism is fixed to the frame 4 at the opposite side of the machine to the tape printing mechanism. The tickets are arranged to be marked and receive the amount paid in each transaction, the date of such transaction, and also, if desired other data; and they are adapted to be cut off from a paper ribbon 155 coiled on a suitable storage roller.

To this end the pence and shillings wheels 138 and 139, which have been moved by or from the gate and racks 74, by the first part of the movement of the handle 2, will be previously inked by inking rollers 150, similar to those above described, as they are moved over from the zero position to their active position; and the date wheels 156 are also moved from their zero position, to the active position each actuation of the machine, and similarly inked by a roller 150. The printings or impressions are in line, one behind the other on the ticket.

The presser block 157 has two raised parts directly under the rollers 138, 139, and 156, which presses different parts of the strip 155 on to these type wheels, and prints them; and the actuation of the block 157 is effected by a lever 158 loose on the shaft 3, and actuated by an adjustable tappet 159 on an arm 160, fixed on the shaft 3, the free end of the lever 158 striking the part 161 of the block 157; and when so struck presses it up. The return action of the block is effected by a spring 162.

The date wheels 156 which will be set each day, say through the mill screw heads 163 through any suitable known means will be reciprocated over their ink roller 152, so that an inked part comes over the block 157, by a bar 164 on the lever 158, the upper end of which engages with the upwardly spring pressed arm 165 on the spindle of the wheel 156, and so turns them; free movement between the upper end of the bar 164 and the arm 165, being allowed so that the rollers shall not be moved when the block 157 is being lifted by the lever 158.

During the first operation of movement of the shaft 3 and arm 160, a rack 167 will be moved up, and this rack engages with a toothed wheel 168 on the spindle 169, and revolves this wheel past the pawl 170 on the roller 171, over which the paper strip 155 passes, which is led between feed rollers 171, 172 (which may be adapted to carry advertising type); the latter of which is carried on the arm 173 supported on a pivot 174, and pressed down by a spring 175. Thus in this free wheel action, the roller 171 is not revolved, during which time the print is being effected from the rollers 138, 139 and 156. In the return stroke of the rack 167, on the return action of the lever 2, the part of the wheel 168 engages with the pawl 170, and revolves this roller 171, at which time the presser 157 will be away from the type wheels; and so the front portion of the ticket will be fed forward over the edge of a lower guillotine knife 176, on to the table 177, and it will feed the required length of ribbon on to this table; and when this is done, the upper guillotine knife 178, which will have been held up, is released, and it cuts off the paper piece, so that the printed portion constitutes a ticket, and can be taken away, being a receipt for the money.

The cutting off blade 178 is held up by the upper end of a bell crank detent 180, pivoted on the lower end of the fixed guillotine blade 176, this detent being removed from this holding up position at the required time, by the part 181 on the rack plate 167 coming on to the other part of the detent, and releasing it from 178. The blade is pulled down by a spring 182.

The plate 178 is pressed up by a cam 183 on shaft 3, which acts on a lever 184 connected with the plate of the blade 178.

The total adder of cash received illustrated in Figs. 8, 9, 10, 11 is effected by toothed wheels 190 and 191, with which the pence and shillings racks 21 aforesaid, engage permanently; and these pence and shillings pinions are adapted to be thrown into and out of gear with the actual indicating pence and shillings drums 192 and 193, respectively, by clutch devices, which in the case shown, consist of toothed parts 195 on the pinions 190 and 191, and corresponding toothed parts 196 on the drums 192 and 193, with which said parts engage and disengage. That is when the racks 21 rise, and the wheels 190 and 191 are revolved, the clutch parts 195 engage with the clutch parts 196 of drums, and revolve them.

In the return action of the racks, the drums 192 and 193 are put out of gear with the clutch parts 195, and at the same time, are put in gear at their opposite sides, with the clutch holding parts 197, with which the clutch parts 198 on the drums 192 and 193 engage.

This engaging and disengaging of the clutch parts is effected from and by the hand operated lever 2, so that while the wheels 192 and 193 are operated through the action of the keys, inasmuch as those keys enable the parts which operate them to move, and actually gage and govern the amount of their movement, the power or hand operated part performs the engaging and disengaging the clutch mechanism or actions.

The actuation of the adder from the hand operated part is by a rod 200, connected below to the hand lever 2, and at the upper end of an arm 201, fixed on a sleeve 202, carrying a rocking plate 203. On this rocking plate is a pin 204, which fits in a grooved sleeve 205 on a rod 206, which passes through two levers 207 pivoted at 208. Springs 209 are provided on the rod 206 between the sleeve 205, and the levers 207, so that when the arm 201 is moved in one direction or the other, one of the springs will be compressed, and be in a condition to act.

The two levers 207 are connected together at their lower ends by a member 214 by hinge joints.

The wheels 192 and 193 are fixed on spindles 210 and 211, which are supported and work through side carrier plates 212, fixed on a frame 213, which is secured at its upper and lower ends in a recess 215, to upper and lower parts 216 of the frames 5 of the machine.

When the handle 2 is being operated in one way or the other, one of two internal flanges 220 of the plate 203, will move behind one of the two projections 221 on the connecting member of plate 214, and so hold the levers 207 against movement while one of the springs 209 is being compressed; and then, when the hand power lever is nearing the end of its outward stroke, by which time the pence and shillings drums 192 and 193 will have been moved by the racks 21, and pinions 190 and 191, the inward flange 220 will have left the projection 221, and so the compressed spring 209 can quickly force the levers 207 over; and will push the two clutch parts 198 of the drums 192 and 193 into engagement with the holding clutch parts 197, and out of action with the toothed wheel clutch parts 195, and so will hold them there. Thus after the drums 192 and 193 have been revolved, they cannot over-run the position to which they have been moved, and they are prevented from changing this position afterward, by being in gear with the stationary clutch parts 197.

The money drums 192 and 193 being now free of the wheels 190 and 191, these wheels can be turned in a reverse direction by the racks 21, which takes place in the return movement of the handle 2.

During this movement the plate 203 will be rocked, and then the other spring 209 will be operated, and the other flange 220 will move behind the other projection 221; and then the compressed spring is liberated in the manner above described, and the wheels 192 and 193 are slid back again by the levers 207 to the position shown in Fig. 6, which completes the operation.

To add a shilling to the shillings counter 193, from the pence counter 192, when the last halfpenny of a shilling has been added to this pence mechanism and wheel 192, a pin 225 on wheel 192, strikes the lower end of the pawl 226, and removes the catch 227 on it from a flange 228 on the holding clutch 197. The effect of this is, that the clutch part 197 can be moved back a distance equal to the pitch apart of the clutch teeth, by a suitable spring (not shown), and the end 229 of the flange will strike the arm 230 of a ring 231, which lies and works within the flange 228, and so holds it. Now, when the arm 201 is pulled down, a catch 232 fixed on the spindle 202, strikes the inner end of a pivoted trip device 233, which has a wire connection 234 connecting it with the ring arm 230, so that in this down-stroke of the arm the ring 231 will be revolved, and will press on the flange part 229, and turn the clutch part 197 around a distance equal to the pitch apart of the teeth, and being engaged with the money drum 193 at this time, will turn this drum around, so as to make this indication give and show the addition of a shilling.

The arm 230 is normally pulled up by a spring 235. The pounds indicator is marked 236, and is disposed above the shillings drum 193, and is worked by a snail cam 237, pawl device 230, and crank 239 on the pound counter spindle, so that when 20/— is recorded by the drum 193, the pounds indicator 236 will be operated and one pound added.

With regard to the money printing or impression recording apparatus, this is also adapted to be used for recording the time by users of the instrument, say when coming to or leaving the place of business, or other act, in which the instrument is used, so their arrival or departure as to time, or other important memoranda may be entered on the record.

To effect this a special time key, say the top left hand key 240 is employed; but as the pushing in of this key would actuate the swinging frame 26, 27, 28, and other movements effected thereby, including that of moving the catch 98, so as to unlock the drawer and actuating the total adder, means is used to prevent it so doing. The drawer is prevented from being actuated by being provided with a pin 241, which strikes one arm of a bell crank lever 242, hinged at 243, which has a rod 244 attached to its other arm, and which it pulls up when actuated, and so lifts up a second drawer catch 245, which engages the fitting on the drawer which the catch 98 works in connection with, and it holds the drawer when this key 240 is pushed in. To avoid the total adder being affected by this key 240, its spindle will lie only just above the upper gate bar 22, so that the gate cannot rise when it is actuated i. e. pressed in.

The handle 2 will be used and operated to effect this time registering, as in other registering actions.

With regard to this timing key 240, the timing mechanism which will be used in connection with the gate may be of any known suitable kind, so that by the movement of parts specified, the type carrying parts would be suitably moved or their movement governed by this mechanism.

Instead of or in addition to the hand lever 2, for operating the mechanism, it may be operated by a rotary crank or handle 247, as shown in Fig. 4.

What is claimed is:—

1. A cash register comprising in combination, sets of keys; a rectilinearly movable gate; a gate locking and releasing movable device operated by the keys; a hand actuated part; and a locking mechanism connected with the part and adapted to be operated by the said gate holding and releasing device when the device is operated, so as to release same; substantially as described.

2. A cash register comprising sets of keys; a bodily rectilinearly movable gate controlled by the keys; a movable tappet; a hand actuated part; movable racks operated by the tappet and partly controlled by the hand operated part; and a paper strip and ticket marking mechanism operated by the racks; substantially as described.

3. A cash register comprising sets of keys; a rectilinearly movable gate controlled by the keys; a hand operated part; a movable tappet on the hand operated part; movable rack bars which are operated by the movable tappet on the complete return stroke; and a holding releasing pawl which engages the rack bars when freed by the tappet at the end of the return stroke; substantially as described.

4. A cash register comprising sets of keys; a movable gate controlled thereby; a controlled lever for operating the gate and connected therewith; a weight which controls the movement of the lever; a hand operated lever which is connected with the controlling weight and serves to remove the weight from the said lever and permit the gate to be operated, and also serves to permit the controlling weight to operate the said lever in opposition to the spring or weight controlling it; substantially as described.

5. A cash register comprising sets of keys; a bodily rectilinearly movable gate controlled by the keys; a gate locking and releasing device operated by the keys; rack mechanism operated by the gate; and money indicating revolving parts operated by the rack mechanism in one direction and released by the device for the return to the normal position; substantially as described.

6. A cash register comprising a bodily rectilinearly movable gate; series of keys; and a gate locking and releasing device which reciprocates in directions at right angles to the directions of movement of the gate device, and is moved by any of the keys, and controls the movement of the gate; substantially as described.

7. A cash register comprising in combination a plurality of sets of keys; a movable gate; a movable locking and releasing device for the gate; a time marking or recording mechanism; and a key which controls the said mechanism and operates in connection with the gate and prevents its movement when operated; and operates the gate locking and releasing device; substantially as described.

8. A cash register comprising a plurality of sets of keys; a bodily rectilinearly movable gate of rectangular form; and a swinging locking and releasing frame which locks and frees the gate; substantially as described.

9. A cash register comprising in combination a plurality of keys 1; a gate 20; swinging locking and releasing frame (26, 27, 28); a total adder device operated by the gate; a main hand operated shaft 3; a weight 80 connected with the shaft 3; a lever 83 connected and operated with the gate, and with the weight; and a spring 30 connected with the lever 83; substantially as described.

10. A cash register comprising in combination value keys; a bodily rectilinearly movable gate which makes contact with the keys and is controlled thereby; a gate locking and releasing device with which the keys make contact and move in a direction at right angles to the direction of movement of the gate to free the gate; substantially as described.

11. A cash register comprising in combination value keys; a bodily rectilinearly movable gate controlled by the keys; a frame actuated by the gate; a spring controlled lever engaged by the frame; a hand operated part engaged and locked in the unoperated position by the lever; and a gate locking and releasing device with which the keys make contact and which they operate to release the gate for the operation of the frame and lever and the release of the hand operated part; substantially as described.

12. A cash register comprising in combination, value keys; a bodily rectilinearly movable gate controlled by the keys; a gate locking and releasing device actuated by the keys; a weight which moves the gate in one direction; and a second weight which moves the gate in the opposite direction and controls the other weight; substantially as described.

13. A cash register comprising in combination, value keys; a bodily rectilinearly movable gate controlled by the keys; a gate locking and releasing device with which the keys make contact and which they operate; a spring which moves the gate in one direction; and a weight which moves the gate in the opposite direction; substantially as described.

14. A cash register comprising in combination, value keys; a bodily rectilinearly movable gate controlled by the keys; a gate locking and releasing device with which the keys make contact and which they operate; a hand actuated part; and a locking mechanism which engages the hand actuated part and is actuated by the said device when the device is actuated by the said keys; substantially as described.

15. A cash register comprising in combination, a bodily rectilinearly movable gate; means for actuating same in one direction; value keys arranged transversely to the direction of movement of the gate; rack mechanism connected with the gate; indicating parts revolved by the rack mechanism; a hand operated weight adapted to return the gate to the zero position; and a gate locking and releasing device with which the keys make contact and which they operate to release the gate; substantially as described.

In testimony whereof we have signed our names to this specification in the presence of two subscribing witnesses.

GEORGE MACBETH.
MALCOLM MACBETH.

Witnesses:
HENRY LAWTON,
SOMERVILLE GOODALL.